UNITED STATES PATENT OFFICE.

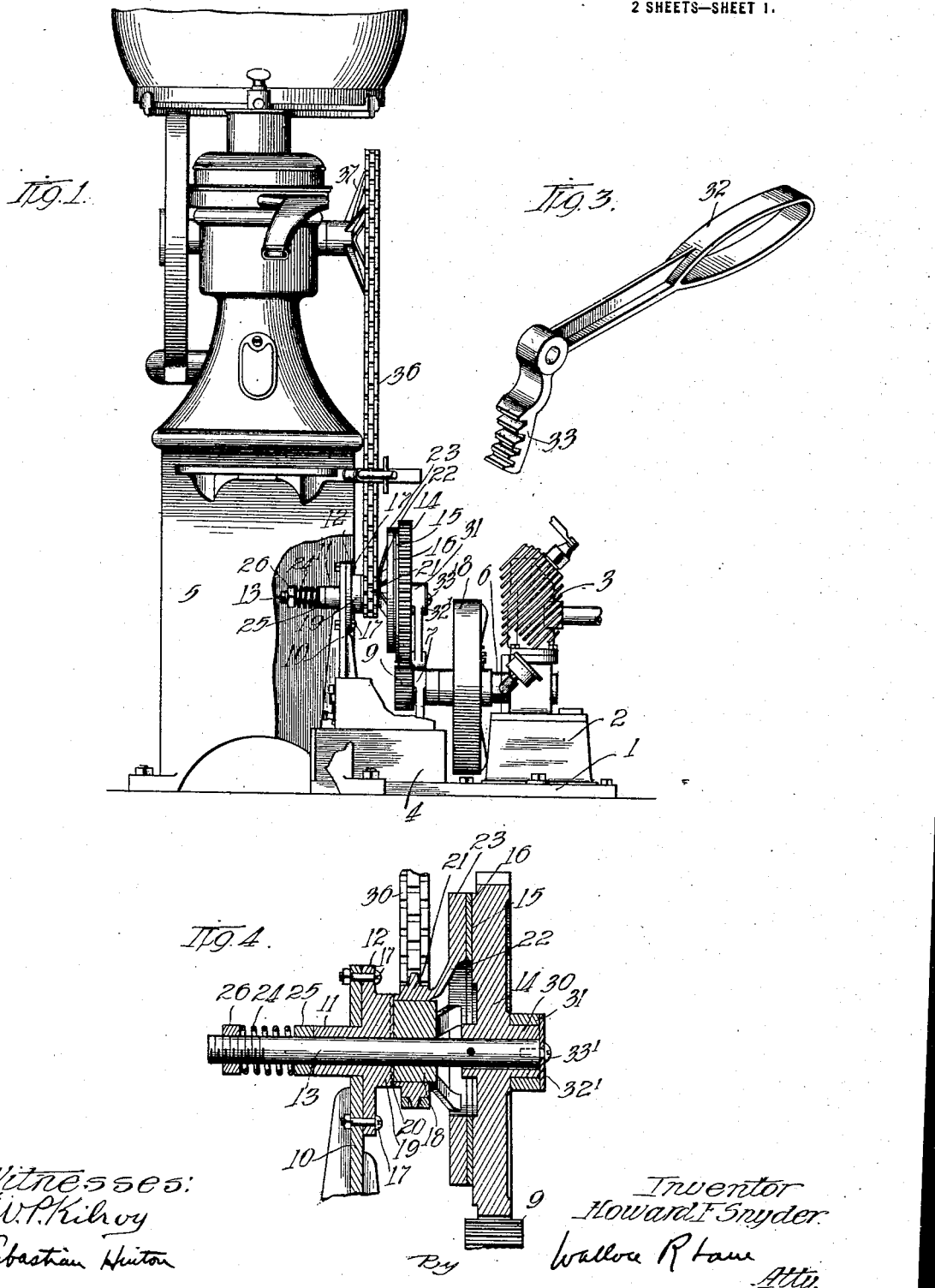

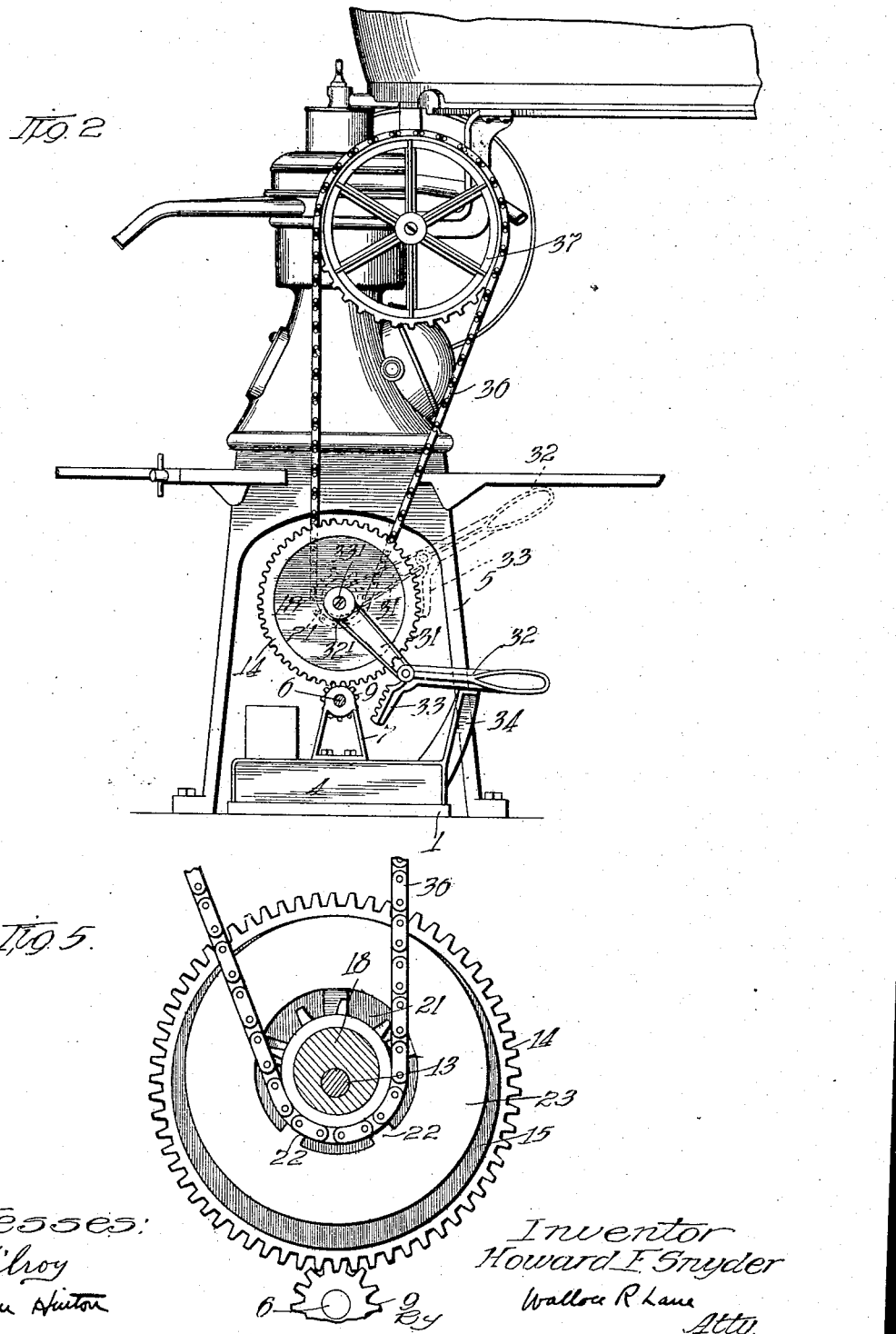

HOWARD F. SNYDER, OF NEWTON, IOWA, ASSIGNOR TO THE MAYTAG COMPANY, OF NEWTON, IOWA, A CORPORATION OF IOWA.

TRANSMISSION MECHANISM.

1,218,812.  Specification of Letters Patent.  Patented Mar. 13, 1917.

Application filed September 1, 1915. Serial No. 48,439.

*To all whom it may concern:*

Be it known that I, HOWARD F. SNYDER, a citizen of the United States, residing at Newton, in the county of Jasper, State of Iowa, have invented new and useful Improvements in Transmission Mechanisms, of which the following is the specification.

This invention relates to transmissions and particularly to a driving device whereby the irregular action of an explosion engine may be transformed to an absolutely smooth drive for a cream separator, dynamo or other device requiring constant speed.

I am aware that friction drives of various forms have heretofore been employed in driving dynamos and other devices in an endeavor to obtain a constant speed drive. These devices of the prior art, however, have all been objectionable for the reason that in actual operation the friction faces which make the driving contact are relatively stationary during the large portion of the operation of the device. This causes these faces to become "set", it requiring more pull to start the faces into relative motion than to continue such relative motion between them with the result that whenever it is necessary for the friction device to serve the purpose for which it was intended and to permit the driving device to run faster or slower than the driven device, this action will be accompanied by sharp jerks in the drive of the driven device as the two friction faces let go and begin to move relatively instead of being relatively stationary. The phenomenon of the "setting" of frictionally engaged devices is well known. A familiar example is that of a sled upon the snow which requires much more force to start it from rest and put it into motion than it would be to keep it in motion or to change its speed while moving.

In other words, frictionally engaged devices if they are relatively moving are "free" and their relative speeds may be changed with practically only the effort which would be necessary to produce the consequent change in speed with the devices not in contact but both driven independently, whereas when frictionally engaged devices are relatively at rest, they become set and it requires a comparatively large impulse to break their engagement and permit relative movement between them.

It is an object of this invention to provide a friction drive applicable to cream separators, dynamos, etc., in which the frictional engaged parts are in continual relative motion no matter what speed the machine may be running.

It is another object of this invention to provide a friction drive comprising friction elements in continual engagement with each other but which move in different paths so as to produce continual relative motion between such friction devices.

It is another object of this invention to provide a combined internal combustion engine and cream separator with a transmission mechanism whereby the jerky action of the engine is equalized by the transmission mechanism.

It is another object of this invention to provide a starting device for an internal combustion engine whereby the parts may be smoothly and easily set into motion and the engine started without a jerk or bump.

In the particular modification of the invention, I show the combination of the cream separator and an internal combustion engine. It is, of course, understood that the dynamo or other constant speed device might be submitted for the cream separator.

In the drawings, Figure 1 is a side elevation of a combined cream separator, dynamo and transmission mechanism.

Fig. 2 is an end elevation of the same.

Fig. 3 is a detailed view of the starting handle.

Fig. 4 is a cross-sectional detailed view of the friction drive.

Fig. 5 is a detailed view in cross-section of a portion of the friction drive.

1 represents a base or platform upon which is mounted the stand 2 of an internal combustion engine generally indicated by 3. The platform 1 is provided with a supporting frame 4 which carries bearings for shafts hereinafter to be described. As shown in the drawings, the platform 1 and stand 4 are inserted between the legs 5 of a cream separator so as to bring the operative parts in proper relation.

The gas engine 3 is provided with a lay shaft 6 having bearings at its outer end in the up-standing lug 7 firmly bolted to the supporting frame 4 as shown in Fig. 2. The shaft 6 is provided with a fly-wheel 8 and at its end with a small pinion 9. At its end adjacent the driven machine, the supporting frame 4 is provided with an upstanding plate 10 having an aperture through which projects the extending sleeve 11 having a flange 12 bolted to the inner side of the plate 10 and providing a bearing for the shaft 13, and an eccentric extension 19. The shaft 13 is provided with a large gear 14 rigidly mounted thereon and in engagement with a pinion 9. Integrally formed with the gear 14 is an annular friction face 15, preferably provided with a friction surface 16 of leather or other suitable material.

Non-revolubly secured to the eccentric extension 19 of the sleeve 11 is an eccentric bushing 18, the extension being provided with corrugations 20 which take into corresponding recesses in the bushing 18 to bind these parts in non-revoluble relation. The outside of the bushing 18 is finished and this bushing serves as a journal for the sprocket 21 integral with which is a spider 22 supporting a friction disk 23. A spring 24 bearing on one end against a washer 25 abutting the sleeve 11 and at its other end against the nut 26 serves to strain the shaft 13 toward the left (Fig. 4) and keep the friction faces in contact.

It will be obvious during the whole time the machine is in operation, the friction faces 23 and 16 will be relatively moving because the two annular friction faces are rotating about different centers.

I will now describe the means for starting the engine:

The gear 14 is provided with a hub 30 serving as a journal for the crank arm 31, a cover plate 32' secured by a screw 33' holding the crank arm upon the hub. Pivotally mounted upon the crank arm 31 is a hand lever 32 provided with a toothed dog 33 and up-standing from the frame 4 is a lug 34 in the plane of the handle 32. To start the machine, the crank arm 31 and handle 32 are moved into position shown in dotted lines in Fig. 2 whereupon a down-push upon the handle 32 will move the gear 14 and by reason of the large gear ratio of gears 14 to 9 will spin the engine and start the same. When the gear has once been moved, the crank arm 32 is simply released whereupon the continued rotation of the gear 14 will carry the handle 32 downwardly until it strikes the lug 34 when it will be rocked backward and the dog 33 automatically disengaged, the parts remaining in the position shown in full lines in Fig. 2. A sprocket chain 36 connects the sprocket 21 with the driving sprocket 37 of the cream separator.

Having thus described my invention, what I claim and desire to secure by Letters Patent is:

1. In apparatus of the class described a driven machine, a prime mover and a connection between the two comprising engaging friction members in relative motion along their engaged surfaces at any speed or any load of the driven friction member whereby the response of the friction members to changes in speed is rendered instantaneous.

2. In apparatus of the class described a prime mover a friction disk driven by said prime mover, a driven machine, a friction disk geared to said machine and in engagement with the first mentioned friction disk, said friction disks being rotatable about different centers.

3. In apparatus of the class described a prime mover, a shaft geared thereto, a friction disk on said shaft, an eccentric hub on said shaft, a second friction disk on said eccentric hub, a driven machine geared to the second friction disk and resilient means for forcing said friction disks together.

4. In apparatus of the class described a prime mover, a shaft thereon, a pinion on said shaft, a gear in mesh with said pinion, a shaft for said gear, a friction disk carried by said gear, an eccentric hub on said second shaft, a second friction disk mounted on said eccentric hub means for forcing said friction disks together, and a driven machine geared to the second friction disk.

5. A slip drive comprising a pair of engaged friction surfaces and means to cause said elements to be in continual relative motion during their normal drive irrespective of the relative speed thereof.

6. A friction drive comprising engaging friction elements moving in non-coincident paths throughout their region of engagement whereby the engaged friction surfaces have a continual relative movement during the normal operation of the drive.

In witness whereof, I hereunto subscribe my name to this specification in the presence of two witnesses.

HOWARD F. SNYDER.

Witnesses:
W. I. SPARKS,
T. A. MOLER.